Sept. 26, 1944.  H. E. SOMES ET AL  2,359,168
FLOW RESPONSIVE DEVICE
Filed May 27, 1942  2 Sheets-Sheet 1

INVENTORS.
Howard E. Somes &
George R. True.
BY John P. Tarbox
ATTORNEY

Sept. 26, 1944.                H. E. SOMES ET AL                2,359,168
                                FLOW RESPONSIVE DEVICE
                            Filed May 27, 1942          2 Sheets-Sheet 2
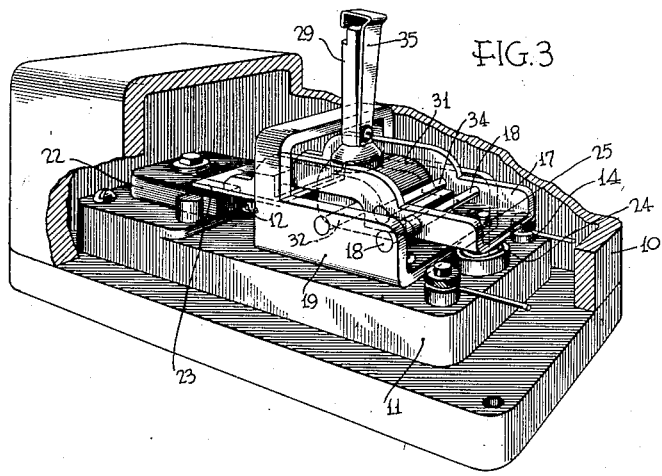
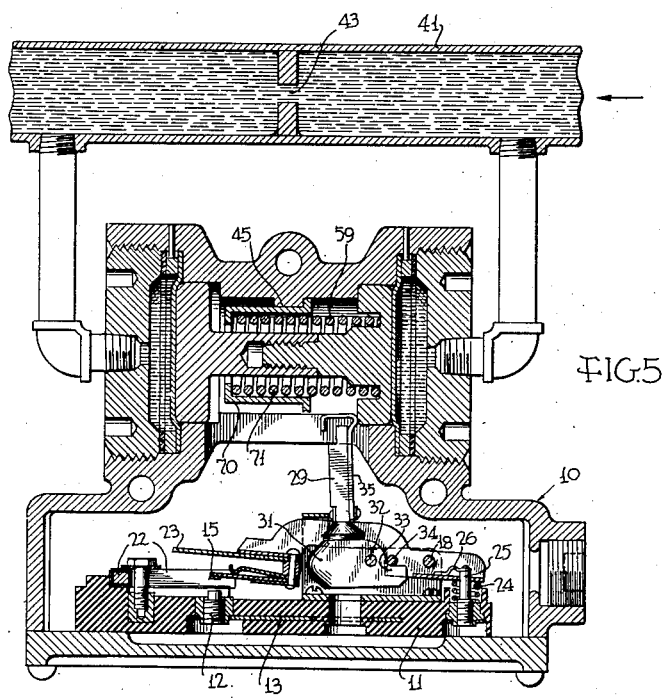
INVENTORS
Howard E. Somes &
George R. True
BY
ATTORNEY Patented Sept. 26, 1944

2,359,168

UNITED STATES PATENT OFFICE 2,359,168

FLOW RESPONSIVE DEVICE

Howard E. Somes and George R. True, Detroit, Mich., assignors to Budd Induction Heating, Inc., Philadelphia, Pa., a corporation of Michigan Application May 27, 1942, Serial No. 444,662

5 Claims. (Cl. 200—81.5)

This invention relates to actuating mechanisms for operating or controlling the operation of various types of devices in accordance with the flow of a fluid. It has been especially developed for use in the heat-treating of metals by electromagnetic induction heating and subsequent quenching, where the application of a heating current and the flow of a coolant for cooling the current carrying conductors, quenching a heated article, or the like, must be accurately coordinated and controlled.

Accordingly, the invention is herein shown and described as used for controlling and operating an electric switch, but it will be understood from the following description that it is susceptible of a far more general application in the art.

An object of the invention is to provide a simple, dependable pressure responsive mechanism for controlling the operation of a device such, for example, as an electric switch.

A further object is to provide a mechanism for use in the heat treating of metals by electromagnetic induction heating and then quenching, constructed and arranged to control the electric heating circuit in accordance with the flow of coolant.

These and other objects which will be apparent are accomplished by the present invention, one adaptation of which is shown in the accompanying drawings in which Figure 1 is a sectional view through a switch controlling pressure responsive mechanism constructed in accordance with one embodiment of this invention showing the parts in circuit closing position;

Figure 3 is a perspective view of the electric switch, the switch casing being broken away;

Figure 5 is a view similar to Figure 1 showing a reversed arrangement of parts in the operating mechanism.

Figure 1:
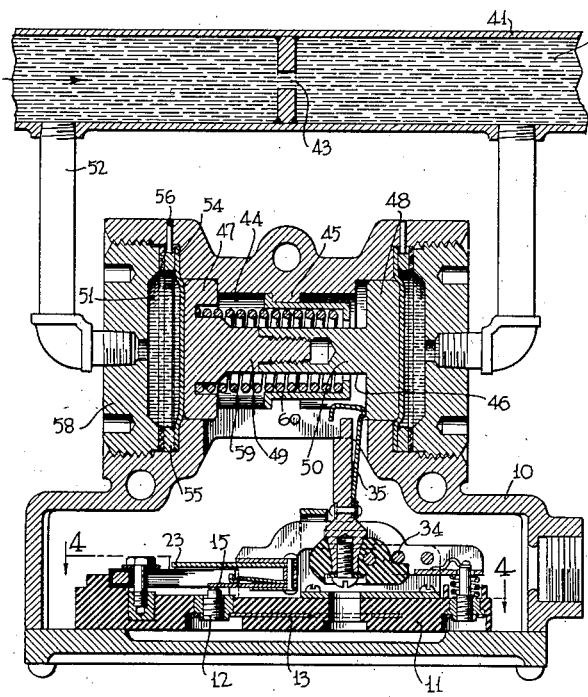
Figure 4:
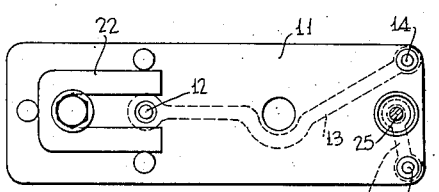
Figure 4 is a plan view of the switch supporting panel member with parts removed.

In general, the present invention comprises a movable member responsive to pressure variations in the flow of fluid through an associated conduit for shifting the actuating member of such a device as an electric switch to open or close the switch in accordance with flow conditions within the conduit.

As illustrated, the invention is shown in connection with an electric switching mechanism located within a switch housing 10 on a supporting panel 11 of any suitable non-conductive material. A stationary contact 12 is mounted in the panel and connected by a bus 13 to a terminal 14. A movable contact 15 is mounted on and electrically connected to a contact supporting plate 16 having a pair of arms 17 pivoted for rocking movement on a pin 18 supported in opposite flanges 19 of a supporting bracket secured to the panel 11. A horseshoe magnet 22 and a magnet plate 23 secured to the contacting supporting plate 16 are provided for snapping the contacts closed.

The arms 17 are normally biased into circuit closing position by coil spring 24 located between the pivoted contact bar and the panel 11, the spring being positioned around a current conducting pin 25 electrically connected to the arms 17 by a flat spring member 26 secured thereto and yieldingly engaging the end of the conducting pin. The latter is connected by a bus 27 to a terminal 28.

The switch operating member is shown in the form of a stem 29 extending upwardly from a rocker 31 pivoted between the bracket flanges 19 on a supporting pin 32 and having a ledge 33 engaging a pin 34 mounted between the movable switch arms 17. A follow-up spring in the form of a flat spring arm 35 is secured to the operating member 29 for engagement by the switch actuating mechanism.

It is to be understood that the above described switch mechanism is simply one example of a device capable of being controlled by the present invention and forms no part of the invention.

As illustrated, the present invention comprises a mechanism for operating the switch and so controlling the associated electric heating circuit in accordance with and in response to conditions of flow in an associated conduit 41 which in the present disclosure is adapted to convey a suitable coolant 42 for cooling the heating equipment, such as for example, the heating coils, transformer coils, capacitors and the like. The conduit is provided with a flow orifice 43.

Figure 2:
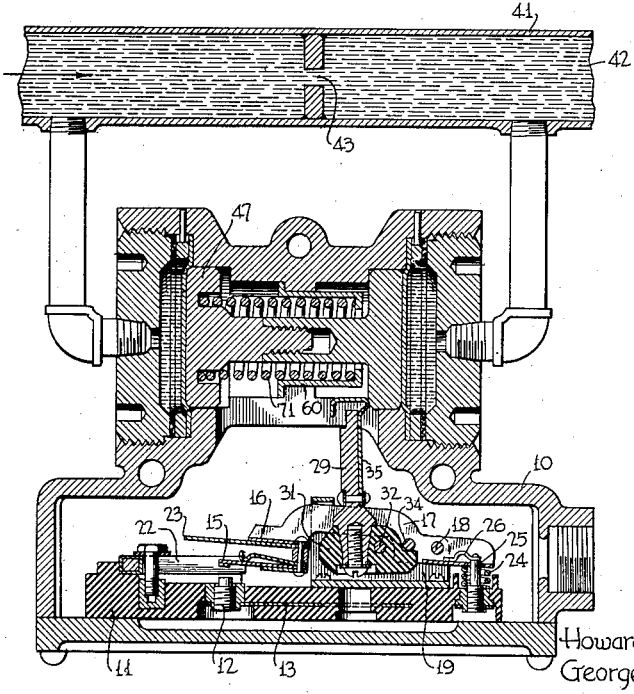
Figure 2 is a similar view showing the parts in open circuit position.

As illustrated in Figures 1 and 2, the switch casing is extended upwardly and forms a cylindrical bore 44 having a central internal flange 45. A plunger 46 slidably mounted in the cylinder is shown as formed with separate head portions 47 and 48 having stems 49 and 50, respectively, threaded or otherwise secured together. A pressure chamber 51 which is closed to the atmosphere is provided in each end of the cylinder casing adjacent the respective piston heads 47, 48 and the separate pressure chambers are each pressure tight except that they are connected by lines 52 to the conduit 41 on opposite sides of the flow orifice 43.

Each pressure chamber is closed on the piston side by a flexible pressure transmitting diaphragm 54 held in place by a diaphragm retaining ring 55 which is in turn secured in place by a pin 56 extending through the casing wall and projecting into a recess formed in the periphery of the retaining ring. A retaining plug 58 is threaded into the casing so as to close the pressure chamber and the pressure line 52 is connected to the pressure chamber through the plug 58.

In the embodiment shown in Figures 1 and 2, the plunger is biased to the left by a coil spring 59 which bears at one end against the piston head 47 and at the other end seats in a spring retaining cup 60 frictionally mounted in the central ridge 45 within the cylinder.

As shown in Figures 1 and 2 the arrangement is such that under conditions of normal flow of coolant through the conduit 41 in the direction of the arrow the switch is maintained by the differential pressures in the two pressure chambers in circuit closing position, see Figure 1, against the pressure of the spring 59. When flow through the conduit is stopped so that pressure on the right of the orifice 43 approximately equals that on the left of the orifice 43, it will be apparent that the pressure in the two pressure chambers and opposite ends of the piston become substantially equal. Under this condition the spring 59 shifts the piston to the left to the position shown in Figure 2. This, in turn, causes the switch operating stem 29 to move to the left moving the rocker 31 to raise the ledge 33 and lift the movable contact 15 away from the stationary contact 12 to break the associated electrical circuit, as shown in Figure 2. Obviously, if for any reason, the pressure at the left of the orifice 43 in the conduit 41 is reduced below normal during normal flow conditions the same operation will be effected.

When an arrangement is desired in which the switch is maintained open during normal flow through the conduit 41, the parts are relatively reversed as shown in Figure 5. This reversal of parts is accomplished by removing the retaining plugs 58, rings 55, and diaphragms 54 whereupon the plunger stems 49 and 50 can be unthreaded and the heads 47 and 48, spring 59 and retaining cup 60 removed and then reassembled in the reversed positions shown in Figure 5. Under these conditions, with the normal flow of coolant in the direction of the arrow, and with the plunger and plunger spring 59 reversed, as shown, the pressure differential across the orifice 43 will result in the right hand pressure chamber receiving sufficient pressure to maintain the plunger in the position illustrated in Figure 5 against spring pressure, in which the switch stem 29 has been shifted to the left and the movable contact 15 raised to break the circuit. When flow through the conduit is stopped so that pressure on the left of the orifice 43 approximately equals that on the right, pressures in the two pressure chambers are substantially equalized and the spring 59 shifts the plunger to the right allowing the switch spring 24 to shift the movable contact into circuit closing position.

It will be noted that the spring 59 is always positioned so as to bias the plunger in a direction opposite to the direction of flow through the associated conduit and that normal flow conditions are employed to move the plunger toward the end of the cylinder so as to compress the spring 59, so that the latter is able to shift the plunger and operate the switch when normal flow conditions are interfered with.

Although I have described a specific embodiment of the present invention and in connection with a definite purpose, it will be apparent that the invention can be applied to other uses and can be variously modified and adapted within the scope of the appended claims.

What is claimed is:

1. The combination with a mechanism having an operating member movable into operative and inoperative positions, of means for controlling said member including a cylinder, a plunger slidable therein for moving said member and having a head at each end of said cylinder, means for separately connecting said heads together, a fluid conveying conduit provided with a flow orifice, pressure transmitting means for transmitting fluid pressure from said conduit on one side of said orifice to one plunger head and from the other side of said orifice to the other plunger head, a spring for yieldingly pressing said plunger toward one end of said cylinder, and a reversible support for said spring whereby said spring can be positioned to press said plunger in either direction.

2. The combination with a mechanism having an operating member movable into operative and inoperative positions, of means for controlling said member including a cylinder, a plunger slidable therein for moving said member and having a head at each end of said cylinder, means for separably connecting said heads together, a fluid conveying conduit provided with a flow orifice, pressure transmitting means for transmitting fluid pressure from said conduit on one side of said orifice to one plunger head and from the other side of said orifice to the other plunger head, a spring for yieldingly pressing said plunger toward one end of said cylinder, a spring retaining cup, and means for supporting said cup in said cylinder to permit reversal thereof whereby said spring can be positioned to press said plunger in either direction.

3. The combination with a mechanism having an operating member movable into operative and inoperative positions, of means for controlling said member including a cylinder, a plunger slidable therein for moving said member and having a head at each end of said cylinder, means for separably connecting said heads together, a fluid conveying conduit provided with a flow orifice, pressure transmitting means for transmitting fluid pressure from said conduit on one side of said orifice to one plunger head and from the other side of said orifice to the other plunger head, a spring for yieldingly pressing said plunger toward one end of said cylinder, a spring retaining cup, and a cup supporting flange centrally located within said cylinder adapted to permit the position of said cup and spring to be reversed relatively to said cylinder to press said plunger selectively in either direction.

4. The combination with a switching device having an operating member movable from one position to another, of means for controlling the position of said member including a fluid conveying conduit, a reciprocable plunger connected to said operating member, means for yieldingly pressing said plunger to hold said member in one position, and means responsive to predetermined flow characteristics in said conduit for moving said plunger against said yielding means to shift said member to another position, said plunger and yielding means being reversible to change the position to which said member is moved by said predetermined flow characteristics.

5. The combination with a switching device having an operating member movable from a normal position to a second position and automatically movable from said second position to said normal position, and a fluid conveying conduit having a restricted orifice therein, means for controlling the movement of said operating member between said first and second positions, comprising a reciprocable plunger for moving said operating member to said second position and having a spring abutment, a support for guiding said plunger and having a spring stop, a compression spring between said spring abutment and spring stop for urging said plunger in one direction, a pair of expansible fluid chambers connected with said conduit at opposite sides of said orifice, said plunger being reciprocably actuated in response to the differential pressures in said chambers, said spring stop and spring being reversible relative to said support to resiliently urge said plunger in the opposite direction.

HOWARD E. SOMES.
GEORGE R. TRUE.